United States Patent
Raman et al.

(10) Patent No.: US 12,537,886 B2
(45) Date of Patent: Jan. 27, 2026

(54) SYSTEM FOR BUILDING A FOUNDATION FOR CUSTOMIZABLE ELECTRONIC RESOURCE TRANSMISSION-BASED ARTIFICIAL INTELLIGENCE MODELS

(71) Applicant: JPMorgan Chase Bank, N.A., New York, NY (US)

(72) Inventors: Natraj Raman, London (GB); Yanchao Sun, Jersey City, NJ (US); Sumitra Ganesh, Short Hills, NJ (US); Manuela Veloso, New York, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 135 days.

(21) Appl. No.: 18/629,443

(22) Filed: Apr. 8, 2024

(65) Prior Publication Data
US 2025/0317500 A1    Oct. 9, 2025

(51) Int. Cl.
*H04L 47/78* (2022.01)
*H04L 67/60* (2022.01)

(52) U.S. Cl.
CPC .................................. *H04L 67/60* (2022.05)

(58) Field of Classification Search
None
See application file for complete search history.

(56) References Cited

U.S. PATENT DOCUMENTS

2024/0364741 A1* 10/2024 Arora ..................... H04L 47/781
2024/0411610 A1* 12/2024 Jaganmohan .......... G06Q 10/06

FOREIGN PATENT DOCUMENTS

CN    112866085 B   *  4/2023
CN    117834727 A   *  4/2024   ............. H04L 41/34

* cited by examiner

*Primary Examiner* — Natisha D Cox
(74) *Attorney, Agent, or Firm* — Greenblum & Bernstein, P.L.C.

(57) ABSTRACT

A system for implementing a resource transmission management tool that processes resource transmissions, the system comprising a processor that is configured to: obtain a first set of requests that comprises a first resource transmission request; transform the first resource transmission request into a first corresponding encoded resource request; generate, by organizing an arrangement of at least the first corresponding encoded resource request, a pre-processed set of requests that comprises the first corresponding encoded resource request; assign, based on a topology of the pre-processed set of requests, a respectively corresponding weight to each transmission request field; analyze the first corresponding encoded resource request according to associated instructions; and generate a response to the associated instructions based on the analysis.

20 Claims, 8 Drawing Sheets

SYSTEM FOR BUILDING A FOUNDATION FOR CUSTOMIZABLE ELECTRONIC RESOURCE TRANSMISSION-BASED ARTIFICIAL INTELLIGENCE MODELS

BACKGROUND

1. Field of the Invention

The field of the invention disclosed herein generally relates to resource transmission management and, more particularly, to a method, system, and computer-readable medium for implementing technology that manages electronic resource transmissions and, thereby, prevents transmitted resources from being lost.

2. Background of the Invention

Currently, individuals and groups of individuals (e.g., organizations) manage their resources (technical, monetary and/or otherwise, such as information in and of itself, e.g., cryptographic keys and other private data) within environments where those resources can be misappropriated or otherwise lost to them. However, resources are essential to the survival of each individual and group in today's society, therefore the loss of such resources can be detrimental to them.

Accordingly, there is a need in the field of the herein-disclosed invention for a technical solution to the foregoing problem.

SUMMARY

The present disclosure, through one or more of its various aspects, embodiments, and/or specific features or sub-component, provides, inter alia, various systems, servers, devices, methods, media, programs and platforms for implementing a resource transmission management tool that manages resource transmissions.

According to an aspect of the present disclosure, a method is provided for implementing a resource transmission management tool that processes resource transmissions. The method may comprise: obtaining a first set of requests that comprises at least a first resource transmission request; respectively transforming each of the at least the first resource transmission request into at least a first corresponding encoded resource request; and generating, by organizing an arrangement of the at least the first corresponding encoded resource request, a pre-processed set of requests that comprises the at least the first corresponding encoded resource request. Each of the at least the first corresponding encoded resource request may include a set of resource transmission request fields that comprises a respectively corresponding set of transmission request field input data and a respectively corresponding set of transmission request field features.

The method may further comprise: assigning, based on a topology of the pre-processed set of requests, a respectively corresponding weight to each transmission request field from among the pre-processed set of requests; analyzing the pre-processed set of requests based on an associated set of instructions; and generating, based on the analyzing, at least one response to at least one instruction from among the associated set of instructions. The pre-processed set of requests may comprise the set of resource transmission request fields of each encoded resource request from among the at least the first corresponding encoded resource request.

In the method, the at least one response may be generated by a large-language model (LLM) first artificial intelligence and machine learning (AI/ML) model.

The method may further comprise: respectively determining, by the analyzing, a corresponding path and authenticity for each requested resource transmission from among the first set of requests; and responding to each requested resource transmission with one from among a rejection, a modification, and an authorization.

In the method, the analyzing may comprise alternatingly receiving: each encoded resource request from among the pre-processed set of requests; and respectively corresponding instructions from among the associated set of instructions.

In the method, the assigning may comprise utilizing an attention mechanism to determine the respectively corresponding weight of each transmission request field from among the set of resource transmission request fields. The attention mechanism may compute the set of weights by exploiting prior information about each encoded resource request from among the pre-processed set of requests.

In the method, within the organized arrangement: the at least the first corresponding encoded resource request may have a first location that is adjacent to a second location that comprises a second encoded resource request that has commonalities with the first resource transmission request; and the first location may be closer to the second location than a third location that comprises a third encoded resource request that has fewer commonalities with the first corresponding encoded resource request than the second encoded resource request.

In the method, each resource transmission request field may include respectively corresponding transmission request field input data that comprises at least one respectively corresponding input from among a corresponding set of possible field-specific inputs; and each possible field-specific input may be mapped to, based on a power-law distribution, a respectively corresponding partition of the corresponding set of possible field-specific inputs.

In the method, the transforming may further comprise utilizing sparse one-hot encoding to encode, as a first corresponding set of vectors, auxiliary request field information that respectively corresponds to each resource transmission request field from among the at least the first resource transmission request.

In the method, the transforming may be performed by a second AI/ML model that utilizes a composite loss function.

According to another aspect of the present disclosure, a system is provided for implementing a resource transmission management tool that processes resource transmissions, the system may comprise: a processor; and memory storing instructions that cause the processor to perform operations when the instructions are executed by the processor. The operations may comprise: obtaining a first set of requests that comprises at least a first resource transmission request; respectively transforming each of the at least the first resource transmission request into at least a first corresponding encoded resource request; and generating, by organizing an arrangement of the at least the first corresponding encoded resource request, a pre-processed set of requests that comprises the at least the first corresponding encoded resource request. Each of the at least the first corresponding encoded resource request may include a set of resource transmission request fields that comprises a respectively corresponding set of transmission request field input data and a respectively corresponding set of transmission request field features.

In the system, when executed, the instructions may cause the processor to perform further operations. The further operations may comprise: assigning, based on a topology of the pre-processed set of requests, a respectively corresponding weight to each transmission request field from among the pre-processed set of requests; analyzing the pre-processed set of requests based on an associated set of instructions; and generating, based on the analyzing, at least one response to at least one instruction from among the associated set of instructions. The pre-processed set of requests comprises the set of resource transmission request fields of each encoded resource request from among the at least the first corresponding encoded resource request.

In the system, when the instructions are executed, the at least one response may be generated by an LLM first AI/ML model.

In the system, when executed, the instructions may cause the processor to perform further operations that may comprise: respectively determining, by the analyzing, a corresponding path and authenticity for each requested resource transmission from among the first set of requests; and responding to each requested resource transmission with one from among a rejection, a modification, and an authorization.

In the system, when the instructions are executed, the analyzing may comprise alternatingly receiving: each encoded resource request from among the pre-processed set of requests; and respectively corresponding instructions from among the associated set of instructions.

In the system, when the instructions are executed, the assigning may comprise utilizing an attention mechanism to determine the respectively corresponding weight of each transmission request field from among the set of resource transmission request fields. The attention mechanism may compute the set of weights by exploiting prior information about each encoded resource request from among the pre-processed set of requests.

In the system, when the instructions are executed, within the organized arrangement: the at least the first corresponding encoded resource request may have a first location that is adjacent to a second location that comprises a second encoded resource request that has commonalities with the first resource transmission request; and the first location may be closer to the second location than a third location that comprises a third encoded resource request that has fewer commonalities with the first corresponding encoded resource request than the second encoded resource request.

In the system, when the instructions are executed: each resource transmission request field may include respectively corresponding transmission request field input data that comprises at least one respectively corresponding input from among a corresponding set of possible field-specific inputs; and each possible field-specific input may be mapped to, based on a power-law distribution, a respectively corresponding partition of the corresponding set of possible field-specific inputs.

In the system, when the instructions are executed, the transforming may further comprise utilizing sparse one-hot encoding to encode, as a first corresponding set of vectors, auxiliary request field information that respectively corresponds to each resource transmission request field from among the at least the first resource transmission request.

In the system, when the instructions are executed, the transforming may be performed by a second AI/ML model that utilizes a composite loss function.

According to yet another aspect of the present disclosure, a non-transitory computer-readable medium is provided for implementing a resource transmission management tool that processes resource transmissions. The computer-readable medium may store instructions that cause a processor to perform operations when the instructions are executed by the processor. The operations may comprise: obtaining a first set of requests that comprises at least a first resource transmission request; respectively transforming each of the at least the first resource transmission request into at least a first corresponding encoded resource request; and generating, by organizing an arrangement of the at least the first corresponding encoded resource request, a pre-processed set of requests that comprises the at least the first corresponding encoded resource request. Each of the at least the first corresponding encoded resource request may include a set of resource transmission request fields that comprises a respectively corresponding set of transmission request field input data and a respectively corresponding set of transmission request field features.

In the computer-readable medium, the instructions cause the processor to perform further operations when the instructions are executed by the processor. The further operations may comprise: assigning, based on a topology of the pre-processed set of requests, a respectively corresponding weight to each transmission request field from among the pre-processed set of requests; analyzing the pre-processed set of requests based on an associated set of instructions; and generating, based on the analyzing, at least one response to at least one instruction from among the associated set of instructions. The pre-processed set of requests may comprise the set of resource transmission request fields of each encoded resource request from among the at least the first corresponding encoded resource request.

In the computer-readable medium, when the instructions are executed, the at least one response may be generated by an LLM first AI/ML model.

In the computer-readable medium, the instructions cause the processor to perform further operations that may comprise: respectively determining, by the analyzing, a corresponding path and authenticity for each requested resource transmission from among the first set of requests; and responding to each requested resource transmission with one from among a rejection, a modification, and an authorization.

In the computer-readable medium, when the instructions are executed, the analyzing may comprise alternatingly receiving: each encoded resource request from among the pre-processed set of requests; and respectively corresponding instructions from among the associated set of instructions.

In the computer-readable medium, when the instructions are executed, the assigning may comprise utilizing an attention mechanism to determine the respectively corresponding weight of each transmission request field from among the set of resource transmission request fields. The attention mechanism may compute the set of weights by exploiting prior information about each encoded resource request from among the pre-processed set of requests.

In the computer-readable medium, when the instructions are executed, within the organized arrangement: the at least the first corresponding encoded resource request may have a first location that is adjacent to a second location that comprises a second encoded resource request that has commonalities with the first resource transmission request; and the first location may be closer to the second location than a third location that comprises a third encoded resource request that has fewer commonalities with the first corresponding encoded resource request than the second encoded resource request.

In the computer-readable medium, when the instructions are executed, each resource transmission request field may include respectively corresponding transmission request field input data that comprises at least one respectively corresponding input from among a corresponding set of possible field-specific inputs; and each possible field-specific input may be mapped to, based on a power-law distribution, a respectively corresponding partition of the corresponding set of possible field-specific inputs.

In the computer-readable medium, when the instructions are executed, the transforming may further comprise utilizing sparse one-hot encoding to encode, as a first corresponding set of vectors, auxiliary request field information that respectively corresponds to each resource transmission request field from among the at least the first resource transmission request.

In the computer-readable medium, when the instructions are executed, the transforming may be performed by a second AI/ML model that utilizes a composite loss function.

Thereby, the invention disclosed herein provides technology for managing resource transmissions and, thereby, prevents such transmitted resources from being lost.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable storage media having instructions stored thereon for one or more aspects of the present technology as described and illustrated by way of the examples herein. In some examples, the instructions include executable code that, when executed by one or more processors, cause the processors to carry out steps necessary to implement the methods of the examples of this technology that are described and illustrated herein.

Figure 1:
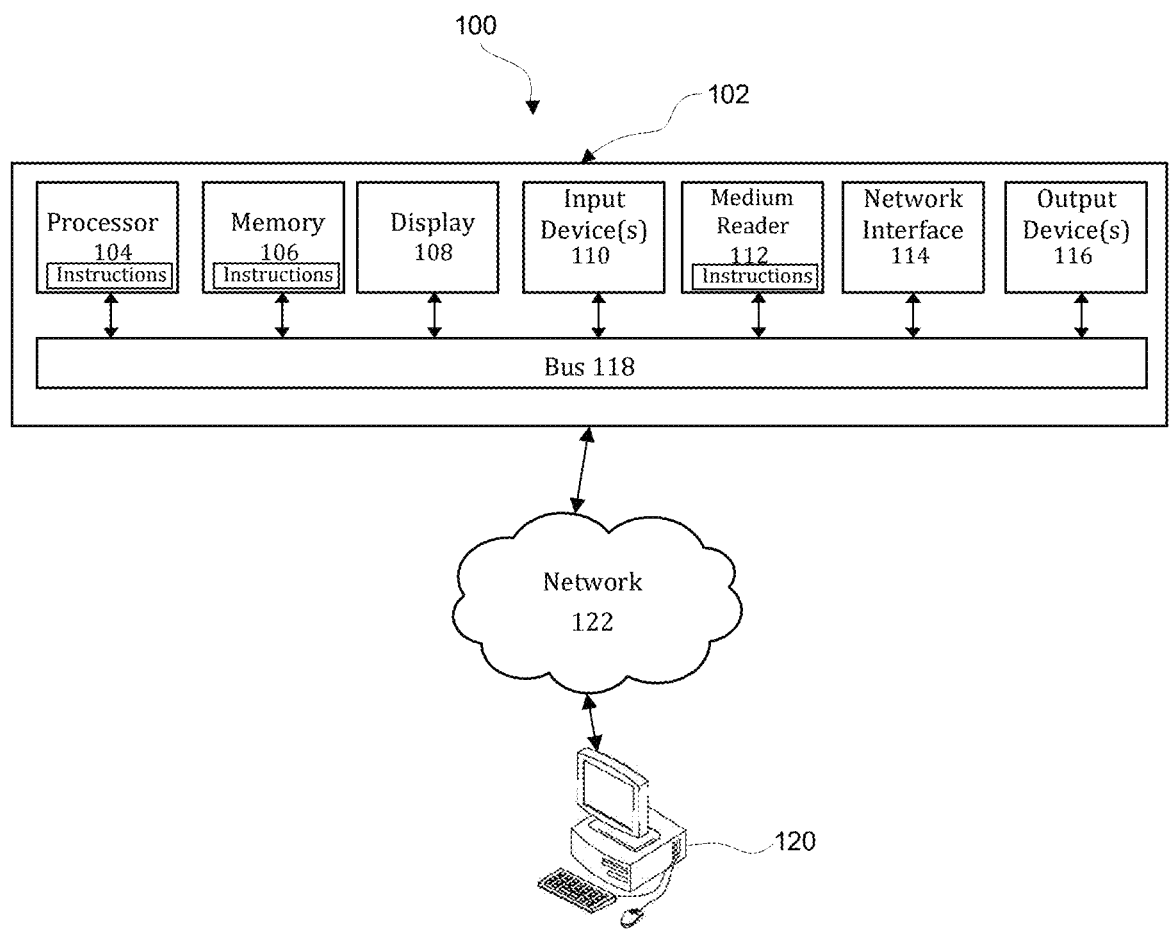
FIG. 1 depicts a diagram of an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for longer than a transitory period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data as well as executable instructions and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As illustrated in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is illustrated in FIG. 1 as a wireless network, those skilled in the art appreciate that the network 122 may also be a wired network.

The additional computer device 120 is illustrated in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide methods and systems for implementing a resource transmission management tool that manages resource transmissions and, thereby, prevents transmitted resources from being lost.

Figure 2:
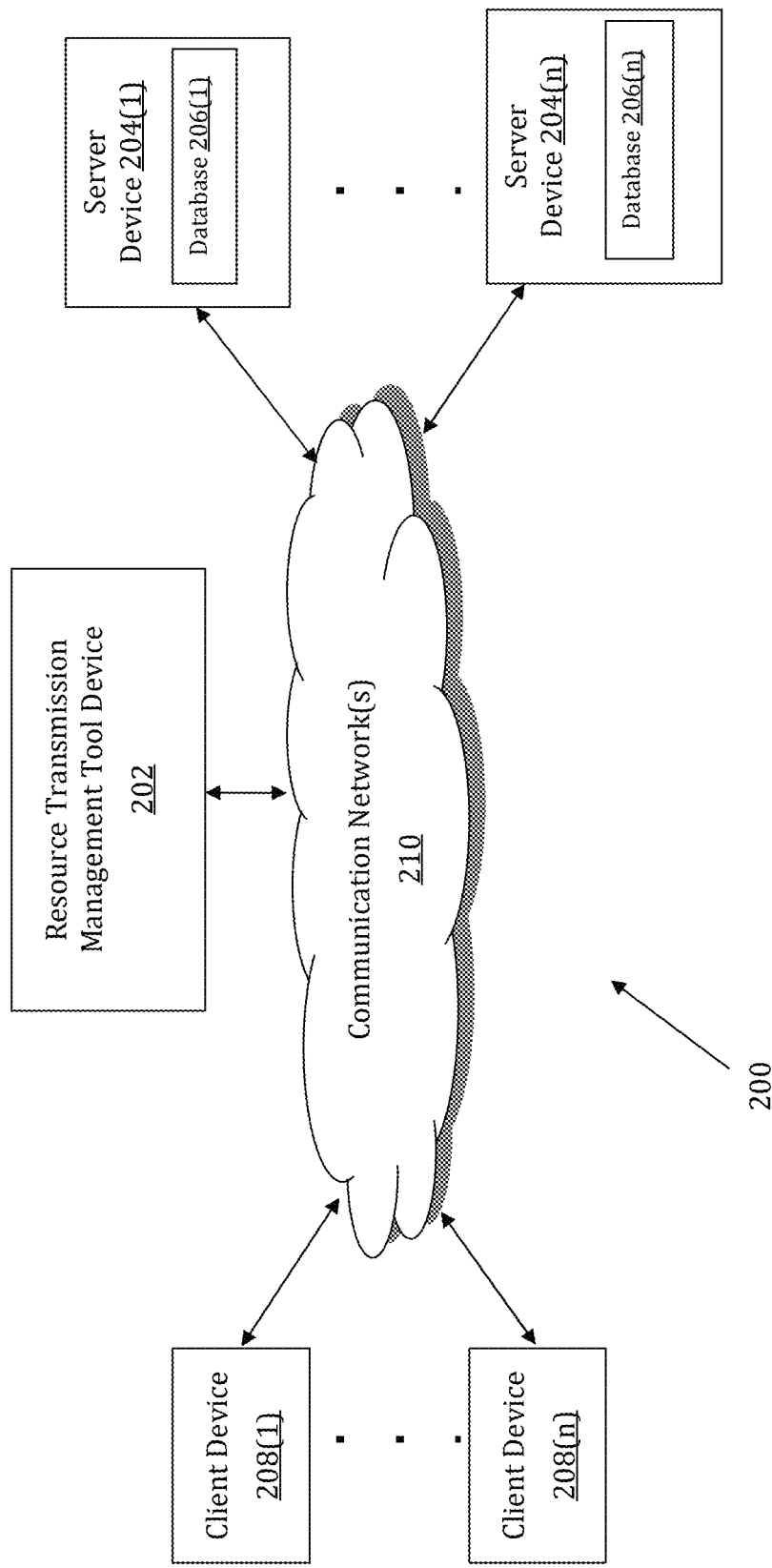
FIG. 2 depicts a diagram of an exemplary network environment for preventing transmitted resources from being lost.

Referring to FIG. 2, a schematic of an exemplary network environment 200 for preventing transmitted resources from being lost. In an exemplary embodiment, a resource transmission management tool may be implemented on any networked computer platform, such as, for example, a personal computer (PC).

A method for implementing a tool that manages resource transmissions, may be implemented by a resource transmission management tool (RTMT) device 202. The RTMT device 202 may be the same or similar to the computer system 102 as described with respect to FIG. 1. The RTMT device 202 may be a rack-mounted server in a datacenter, an embedded microcontroller (MCU) in an electronic device, or another type of headless system, which is a computer system or device that is configured to operate without a monitor, keyboard and mouse. The RTMT device 202 may store one or more applications that can include executable instructions that, when executed by the RTMT device 202, cause the RTMT device 202 to perform actions, such as to transmit, receive, or otherwise process network communications, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the RTMT device 202 itself, may be located in virtual server(s) running in a cloud-based computing environment rather than being tied to one or more specific physical network computing devices. Also, the application(s) may be running in one or more virtual machines (VMs) executing on the RTMT device 202. Additionally, in one or more embodiments of this technology, virtual machine(s) running on the RTMT device 202 may be managed or supervised by a hypervisor.

In the network environment 200 of FIG. 2, the RTMT device 202 is coupled to a plurality of server devices 204(1)-204(n) that hosts a plurality of databases 206(1)-206(n), and also to a plurality of client devices 208(1)-208(n) via communication network(s) 210. A communication interface of the RTMT device 202, such as the network interface 114 of the computer system 102 of FIG. 1, operatively couples and communicates between the RTMT device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the RTMT device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, computer readable media, and RTMT devices that implement a method for a resource transmission management tool that manages resource transmissions and, thereby, prevents transmitted resources from being lost.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The RTMT device 202 may be a standalone device or integrated with one or more other devices or apparatuses, such as one or more of the server devices 204(1)-204(n), for example. In one particular example, the RTMT device 202 may include or be hosted by one of the server devices 204(1)-204(n), and other arrangements are also possible. As another example, the RTMT device 202 may be integrated with one or more other devices or apparatuses, such as one or more of the client devices 208(1)-208(n). Moreover, one or more of the devices of the RTMT device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, memories and communication interfaces, which are coupled together by at least one bus or other communication link, although other numbers and/or types of network devices may be used. The server devices 204(1)-204(n) in this example may process requests received from the RTMT device 202 via the communication network(s) 210 according to an HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store data that relates to a variety of databases.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the RTMT device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the RTMT device 202 via the communication network(s) 210 in order to communicate user requests and other information. The client devices 208(1)-208(n) may further include, among other features, a display device, such as a display screen or touchscreen, and/or an input device, such as a keyboard, for example.

Although the exemplary network environment 200 with the RTMT device 202, the server devices 204(1)-204(n), the databases 206(1)-206(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the RTMT device 202, the server devices 204(1)-204(n), the databases 206(1)-206(n), or the client devices 208(1)-208(n), for example, may be configured to operate as virtual instances on the same physical machine. In other words, one or more of the RTMT device 202, the server devices 204(1)-204(n), the databases 206(1)-206(n), or the client devices 208(1)-208(n) may operate on the same physical device rather than as separate devices communicating through communication network(s) 210. Additionally, there may be more or fewer server devices 204(1)-204(n), databases 206(1)-206(n), or client devices 208(1)-208(n) than illustrated in FIG. 2.

In addition, two or more computing systems, databases or devices may be substituted for any one of the systems, databases or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
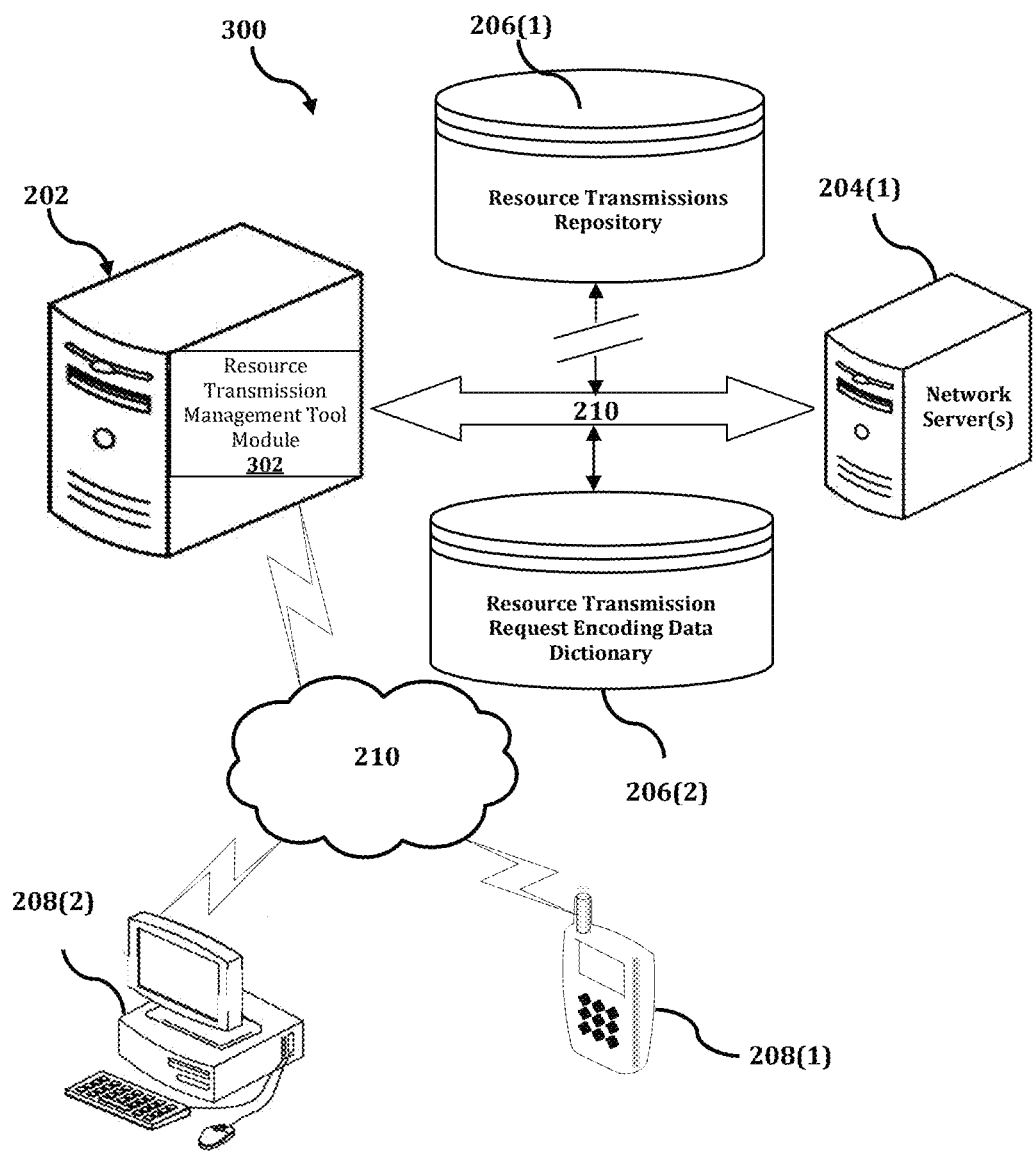
FIG. 3 depicts a diagram of an exemplary perspective of a network environment for preventing transmitted resources from being lost.

The RTMT device 202 is described and illustrated in FIG. 3 as including resource transmission management tool module 302, although it may include other rules, policies, modules, databases, or applications, for example. As will be described below, resource transmission management tool module 302 is configured to manage electronic resource transmissions in a manner that prevents transmitted resources from being lost. Resource transmission management tool module 302 may include software that is based on a microservices architecture.

Resource transmission management tool module 302 may be integrated with one or more devices or apparatuses, such as client devices 208(1)-208(n), where resource transmission management tool module 302 may be implemented as an application or as an addon or plugin to another application of the one or more devices or apparatuses, and where resource transmission management tool module 302 may execute in the background.

An exemplary process 300 for application of a resource transmission management tool to an aspect of the network environment of FIG. 2 is illustrated as being executed in FIG. 3. Specifically, a first client device 208(1) and a second client device 208(2) are illustrated as being in communication with RTMT device 202. In this regard, the first client device 208(1) and the second client device 208(2) may be "clients" of the RTMT device 202 and are described herein as such. Nevertheless, it is to be known and understood that the first client device 208(1) and/or the second client device 208(2) need not necessarily be "clients" of the RTMT device 202, or any entity described in association therewith herein. Any additional or alternative relationship may exist between either or both of first client device 208(1), second client device 208(2) and RTMT device 202, or no relationship may exist.

Further, RTMT device 202 is illustrated as being able to access resource transmissions repository 206(1), and resource transmission request encoding data dictionary 206(2). RTMT device 202 may comprise resource transmission management tool module 302, which communicates with resource transmissions repository 206(1). In addition, resource transmission management tool module 302 of RTMT device 202 may also communicate with resource transmission request encoding data dictionary 206(2). Resource transmission management tool module 302 may be configured to manage electronic resource transmissions in a manner that prevents transmitted resources from being lost.

Moreover, RTMT device 202 may receive and transmit data via communication network(s) 210. RTMT device 202 may receive and transmit data such as code that is written in one or more of the following dialects: transaction control language (TCL), data manipulation language (DML), data control language (DCL) and data definition language (DFL). Additionally, via communication network(s) 210, RTMT device 202 may respectively receive and transmit data from and to one or more from among the following devices: server device 204, resource transmissions repository 206(1), resource transmission request encoding data dictionary 206(2) (or another database 206), first client device 208(1), the second client device 208(2), and communication network(s) 210, for example.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The client devices 208(1)-208(n) may represent, for example, computer systems of an organization's client network. The first client device 208(1) may represent, for example, one or more computer systems of a client or of a cluster of clients within the organization or client network. Of course, the first client device 208(1) may include one or more of any of the devices described herein. The second client device 208(2) may be, for example, one or more computer systems of another client or cluster of clients within the organization or client network. Of course, the second client device 208(2) may include one or more of any of the devices described herein.

The process may be executed via the communication network(s) 210, which may comprise plural networks as described above. For example, in an exemplary embodiment, either or both of the first client device 208(1) and the second client device 208(2) may communicate with the RTMT device 202 via broadband or cellular communication. Of course, these embodiments are merely exemplary and are not limiting or exhaustive.

Resource transmission management tool module 302 provides a programmatic approach to electronic resource transmission that prevents transmitted resources from being lost.

Resource transmission management tool module 302 may execute a process that manages electronic resource transmissions and, thereby, prevents transmitted resources from being lost. An exemplary process for a resource transmission management tool is generally indicated at flowchart 400 in FIG. 4.

Figure 4:
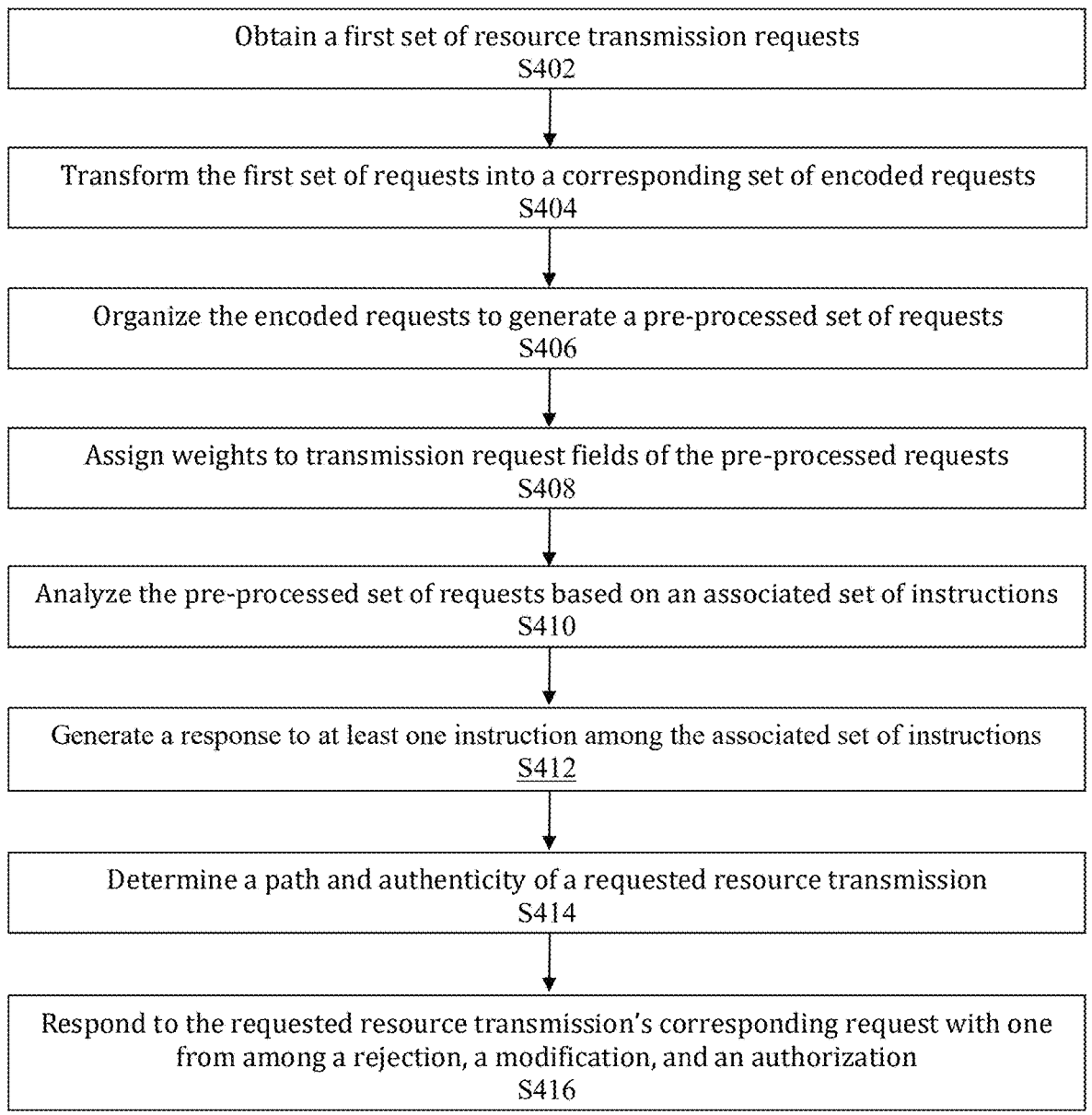
FIG. 4 depicts a flowchart of an exemplary process for preventing transmitted resources from being lost.

In process 400 of FIG. 4, at step S402, resource transmission management tool module 302 obtains a first set of requests that comprise at least a first resource transmission request. Subsequently, at step S404, resource transmission management tool module 302 respectively transforms each of the at least the first resource transmission request into at least a first corresponding encoded resource request.

In an embodiment, each of the at least the first corresponding encoded resource request includes a set of resource transmission request fields that comprises a respectively corresponding set of transmission request field input data and a respectively corresponding set of transmission request field features.

In the embodiment, each resource transmission request field may include respectively corresponding transmission request field input data that comprises at least one respectively corresponding input from among a corresponding set of possible field-specific inputs, and each possible field-specific input may be mapped to a respectively corresponding partition of the corresponding set of possible field-specific inputs based on a power-law distribution.

In exemplary embodiments, resource transmissions repository 206(1) may store a resource network's resource transmissions and resource transmissions requests, and resource transmission request encoding data dictionary 206(2) may store each possible field-specific input's mapping to its respectively corresponding partition of a corresponding set of possible field-specific inputs. Accordingly, resource transmission management tool module 302 may obtain resource transmission records from resource transmissions repository 206(1) for processing, and resource transmission management tool module 302 may store resource transmission request records within resource transmissions repository 206(1) for future use.

In a further embodiment, at step S404, resource transmission management tool module 302 may utilize sparse one-hot encoding to encode, as a first corresponding set of vectors, auxiliary request field information that respectively corresponds to each resource transmission request field from among the at least the first resource transmission request.

In such a further embodiment, one-hot encoding may be employed to eliminate a bias that conventional AI/ML models tend to assign to particular integers because one-hot encoding is a feature-value encoding technique where each possible value of a particular feature is mapped to a respectively corresponding bit of a binary integer that is the aggregate of each respectively corresponding bit.

Thereby, applying one-hot encoding to a feature-value produces a binary integer whose only non-zero (or "hot") bit is the bit that respectively corresponds to the actual value of the particular feature that is being encoded. As described herein, sparse one-hot encoding refers to a condensed, compressed, and/or otherwise reduced-sized, one-hot encoded dataset.

In yet an even further embodiment, resource transmission management tool module 302 may perform the transformations of step S404 via a first artificial intelligence and machine learning (AI/ML) model that utilizes a composite loss function.

At step S406, resource transmission management tool module 302 generates a pre-processed set of requests that comprises the at least the first corresponding encoded resource request. Specifically, at step S406, resource transmission management tool module 302 generates the pre-processed set of requests by organizing an arrangement of the at least the first corresponding encoded resource request.

In an embodiment, the at least the first corresponding encoded resource request has a first location that is adjacent to a second location that comprises a second encoded resource request that shares commonalities (e.g., features, attributes, values, etc.) with the first resource transmission request, and the first location is closer to the second location than a third location that comprises a third encoded resource request that shares fewer commonalities (e.g., a subset of the former set of commonalities) with the first corresponding encoded resource request than the second encoded resource request.

At step S408, resource transmission management tool module 302 assigns a respectively corresponding weight to each transmission request field from among the pre-processed set of requests. In an embodiment, at step S408, resource transmission management tool module 302 may utilize machine learning to assign the respectively corresponding weights. In an additional or alternative embodiment, at step S408, the transmission request fields among the pre-processed set of requests may be assigned the respectively corresponding weights based on a topology of the pre-processed set of requests.

In a further embodiment, each weight may be a context-dependent weight and/or each weight may be assigned using billions of parameters. In an exemplary embodiment, at step S408, a cost function which may also be known as a loss function (such as composite loss function 808) may be utilized by resource transmission management tool module 302 to assign the respectively corresponding weights to the transmission request fields among the pre-processed set of requests.

In a further embodiment, at step S408, resource transmission management tool module 302 may utilize a backpropagation algorithm to assign the respectively corresponding weights to the transmission request fields among the pre-processed set of requests. In an even further embodiment, a gradient descent optimization algorithm may be utilized to assign the respectively corresponding weights to the transmission request fields among the pre-processed set of requests.

For the purposes of this disclosure, a "backpropagation algorithm" may refer to a neural network (AI/ML) model training method that avoids making any redundant intermediate determinations (when determining the respectively corresponding weights) and/or ultimately determines the respectively corresponding weights by iteratively determining each respectively corresponding weight one respectively corresponding weight at a time.

Such a backpropagation algorithm may begin by determining a weight for a last transmission request field among the pre-processed set of requests, then the backpropagation algorithm may iteratively determine a respectively corresponding weight for each transmission request field from among the pre-processed set of requests (in a reverse order of the transmission request fields among the pre-processed set of requests), and the backpropagation algorithm may conclude by determining a weight of an initial transmission request field among the pre-processed set of requests.

For the purposes of this disclosure, a "gradient descent optimization algorithm" may refer to an iterative first-order optimization algorithm that utilizes backpropagation to determine the respectively corresponding weights by determining a set of transmission request field weights that minimize a cost/loss function (e.g., composite loss 808). In such an embodiment, the respectively corresponding weights may comprise the set of transmission request field weights that minimize the cost/loss function.

At step S410, resource transmission management tool module 302 analyzes the pre-processed set of requests based on an associated set of instructions. In an embodiment, resource transmission management tool module 302 may perform the analysis of step S410 by utilizing an attention mechanism to determine a set of weights that respectively correspond to each transmission request field from among the set of resource transmission request fields.

In the embodiment the set of weights may be determined for each encoded resource request from among the pre-processed set of requests, and the attention mechanism may compute the set of weights by exploiting prior information about each encoded resource request from among the pre-processed set of requests.

At step S412, resource transmission management tool module 302 generates at least one response to at least one instruction from among the associated set of instructions, and resource transmission management tool module 302 generates the at least one response based on the analyzing. In an embodiment, the associated set of instructions may comprise application specific instructions that pertain to at least one from among resource reconciliation, resource transmission settlement, resource transmission optimization, resource protection, etc., for example.

In the embodiment, the analyzing may comprise alternatingly receiving: each encoded resource request from among the pre-processed set of requests; and respectively corresponding instructions from among the associated set of instructions. Moreover, in the embodiment, the at least one response may be generated by a large-language model (LLM) first artificial intelligence and machine learning (AI/ML) model. Furthermore, in the embodiment, the LLM AI/ML model may comprise a parameter-efficient LLM that employs adaptive modules.

At step S414, resource transmission management tool module 302 respectively determines, by the analysis, a corresponding path and authenticity for each requested resource transmission from among the first set of requests. Subsequently, at step S416, resource transmission management tool module 302 responding to each requested resource transmission with one from among a rejection, a modification, and an authorization.

Accordingly, resource transmission management tool module 302 thereby implements technology that manages electronic resource transmissions and, thereby, prevents transmitted resources from being lost. Other applications for resource transmission management tool module 302 include the implementation of forecasting, resource allocation and inventory management technology that determines at least one field of a given transmission record based on the given transmission record's remaining fields. Further applications include personalized recommendation of optimal fields to use in transmission, and assessing the risk associated with a transmission record for validation and/or compliance.

As presented herein, resource transmission systems may be used to facilitate digital transfer(s) of resources from one or more transferors to one or more transferees. As such, resource transmission systems may serve as an essential component in conducting a resource transmission between entities such as individuals and/or organizations. Resource transmission systems are complex systems that may be involved in vast amounts of resource transmissions at any given time.

Hence, these complex systems typically handle a large volume of transactions that may involve intricate processes and a wide range of entities. However, as presented herein, artificial intelligence-driven analytics may be utilized to improve various aspects of a resource transmission system. For example, artificial intelligence-driven analytics may be utilized to optimize such a resource transmission system's transmissions.

Artificial intelligence-driven solutions to such analytics are conventionally built from scratch. However, the approach presented herein provides a foundational model from which such solutions may be derived. Accordingly, a foundational model may serve as a common basis for several use-application models in the resource transmission domain. These models may be designed using billions of parameters and pre-trained on large amounts of resource transmissions, which allows acquiring a broad and nuanced understanding of the complex structures and patterns exhibited by resource transmission data.

Such pre-trained models may be further tuned based on application specific instructions in a multi-task learning setting, and the pre-trained models may be provided with a flexible language-based application programming interface (API), which may comprise a graphical user interface (GUI).

The pre-trained foundational artificial intelligence model approach presented herein, provides many advantages. For example, the huge scale of this approach enhances the foundational model's expressive power and memory capacity, which enables zero-shot generalization and emergent functionalities. Additionally, pre-training on a large corpus of resource transmissions allows capturing resource transmission-specific terminologies, concepts, and behaviors, with a nuanced focus on the target domain when compared with general purpose models.

In addition to the foregoing advantages, it should also be noted that training a foundational model from scratch may offer better control over the knowledge sources, which is critical for mitigating artificial intelligence-specific issues, such as hallucinations, result explainability, and results lineage tracking. Furthermore, having a common foundational artificial intelligence model minimizes technical debt by simplifying the training process and reducing the deployment footprint. Moreover, the foundational model may be reused for several tasks and it can also be built upon for previously unseen applications and tasks.

As presented herein, a system for providing a foundational model may utilize an encoder-decoder architecture where the representation of resource transmissions is decoupled from language-based reasoning. A diagram of such an exemplary system 500 is generally depicted in FIG. 5, where an encoder 502 learns representations of resource transmission records (namely, transaction records) and a decoder 504 transforms encoded resource transmissions (i.e., the transmission/transaction representation) to standard text and provides a language-based interface to flexibly interact with a user or external system.

Figure 5:
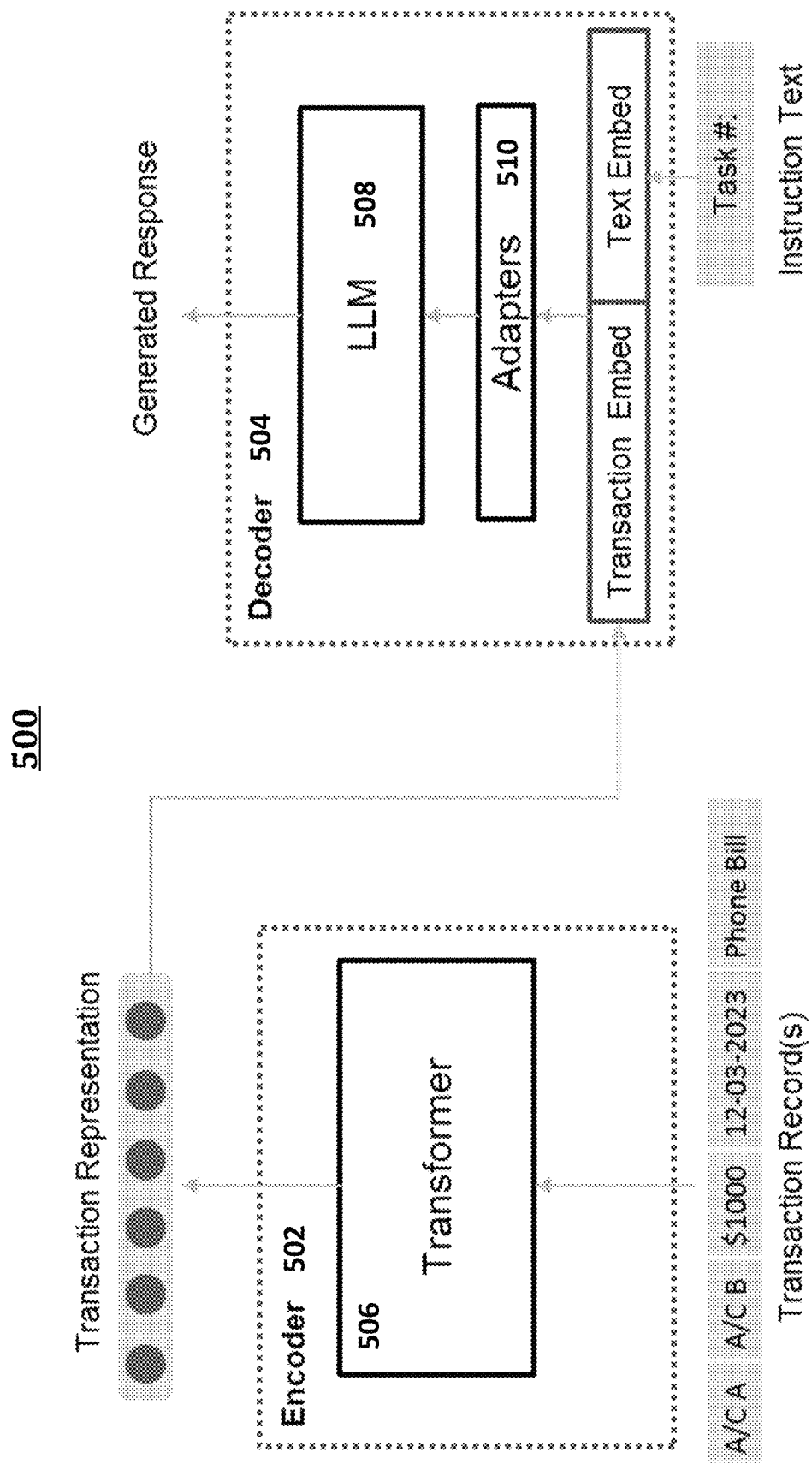
FIG. 5 depicts a diagram of an exemplary system for preventing transmitted resources from being lost.

Specifically, in FIG. 5, system 500 comprises encoder 502 that includes a transformer 506 and first learns fixed length high dimensional continuous vectors in order to characterize a resource transmission. As depicted in FIG. 5, transformer 506 may receive a resource transmission record (namely, a "transaction record") that comprises several fields, which may include source and destination identifiers, a transmission amount, a transmission date, and a purpose for the resource transmission. However, it should be noted that such a monetary transmission is merely exemplary and may comprise the transmission of other types of resources instead.

The fields of the resource transmissions presented herein may cover different data types including nominal, ordinal, free-text, numeric and date. As depicted in FIG. 5, transformer 506 may encode the resource transmission record that it received and output an encoded version of the resource transmission record (namely, a "transaction representation").

As further depicted in FIG. 5, system 500 also comprises decoder 504, which includes adapters 510 and is based on at least one LLM 508. As depicted in FIG. 5, decoder 504 may be a muti-modal decoder component that receives encoded resource transmissions (namely, the "transaction representation" output by encoder 502).

A resource transmission record may be compactly encoded by an encoder component that includes field centric embedding vectors and an embedding vector that summarizes the entire record using a transformer network structure, namely transformer 506.

During a decoding phase, transaction embeddings (depicted as "transaction embed") may be augmented with task-specific instruction text embeddings (depicted as "text embed") and refined by utilizing an adapter layer (namely, adapter 510) that modifies multi-model embeddings in a manner suitable for large language models (LLMs) to process. Subsequently, an LLM may generate appropriate text-based responses, which may include predictions and explanations.

LLMs such as LLM 508, for example, offer foundational capabilities and are designed to be proficient across a wide range of domains and tasks using a single integrated model. In contrast to the general-purpose nature of LLMs, the foundational model presented herein is domain specific and trained exclusively on resource transmission data. Such a resource transmission-based foundational model has a compact and bespoke design utilizing a relatively smaller number of parameters.

Furthermore, unlike the uniform treatment of different data types such as text, numbers, and date in an LLM, a resource transmission-based foundational model is multi-modal and explicitly differentiates the various data types by capturing their distinct characteristics. LLMs standardize the inputs and outputs using a small, fixed vocabulary of tokens that can be applied across several words. Conversely, the inputs to a resource transmission-based foundational model span an enormously large vocabulary that may not be conducive to be reused.

Architecturally, the LLMs use a simple next token prediction learning objective in a generative setting. While this may be efficient for textual data due to their well-defined grammar, the complex structures in resource transmission transactions necessitate bespoke architecture designs and multi-faceted learning objective functions.

In an embodiment, when instruction tuning an LLM for downstream tasks, each of the LLM's parameters may be modified. However, updating each parameter can be infeasible, especially for multi-billion scale LLMs. In addition, updating every parameter may make the AI/ML model susceptible to the artificial intelligence issue of catastrophic forgetting, where an artificial intelligence model's prior knowledge is inadvertently overwritten due to modifications to its weights.

In order to overcome these challenges, a parameter efficient tuning procedure is presented herein, where an LLM parameters' weights are frozen during tuning/training procedures. According to this procedure, a new set of parameters referred to as "adapters" (such as adapters 510, for example) is introduced to modify the embeddings (or transaction representation) input into or received by decoder 504. This adaptation allows existing LLMs such as LLM 508 to be utilized to generate responses without modifying the LLM's parameters.

In exemplary embodiments of the approach presented herein, there may be two (2) different adapters: (1) record adapter, which adapts a resource transmission record embedding; and (2) a task adapter, which adapts interleaved embeddings that alternatingly correspond to a corresponding transaction record and instruction text. In these embodiments, each of their adapters may utilize a set of transformer layers to perform a parameterization function of a set of adapts, such as adapters 510, for example.

In an embodiment, during training, a record adapter's weights may be learned while weights of a corresponding encoder, LLM, and task adapter, are frozen. Thereby, the model may be utilized to generate a fluent text version of a resource transmission record/request. Subsequently, the task adapter's weights may be learned while weights of the encoder, LLM, and record adapter, are frozen.

Accordingly, the resulting model may be utilized to generate task specific responses and explanations with respect to resource transmission records and corresponding task specific instructions. For even faster convergence and improved generalization, the adapters of the system(s) described herein may also be decoupled from an alternate learning model that is curriculum-based.

Figure 6:
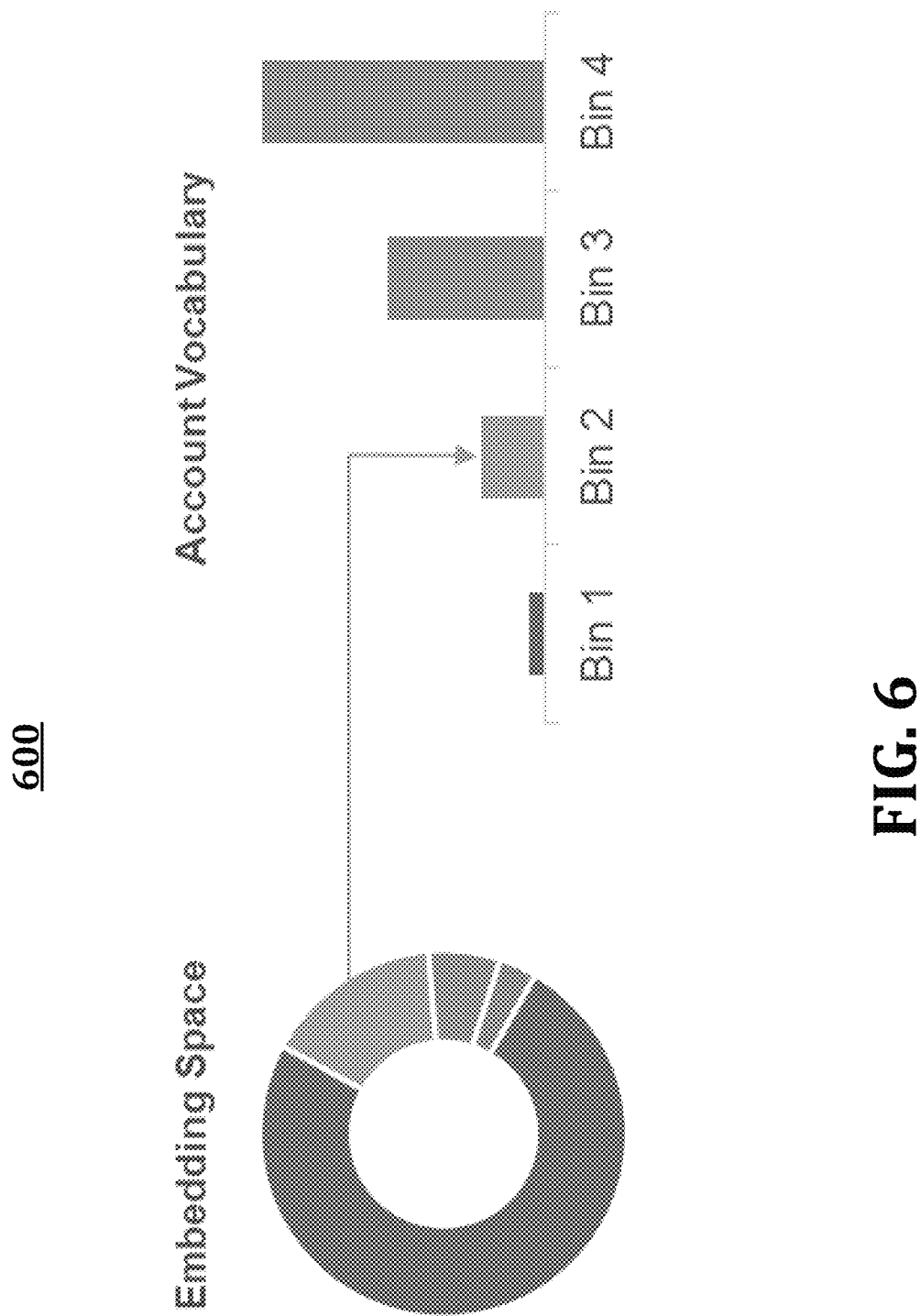
FIG. 6 depicts an exemplary distribution of a vocabulary that is mapped to embedding space partitions.

FIG. 6 depicts a graphical illustration of an exemplary mapping 600 of an embedding space's correspondence to an exemplary vocabulary, namely a vocabulary of available and/or existing user accounts.

In an embodiment, when a resource transmission record is input into a system such as system 500 (and/or resource transmission management tool module 302), the input resource transmission record may then be tokenized and the fields in the record may be mapped to their corresponding vocabulary (e.g., account vocabulary, date vocabulary, resource type/amount vocabulary, etc.). In this embodiment, a separate vocabulary is maintained for each field type—e.g., an account vocabulary for source and destination identifiers, an amount vocabulary for resource transmission amounts, a text vocabulary for text-based fields, and a numbers vocabulary for numeric fields, for example.

As discussed above, the mappings of each field's vocabulary may be stored within resource transmission request encoding data dictionary 206(2), which may be utilized to encode a resource transmission or a resource transmission request. For example, a system (such as system 500 and/or resource transmission management tool module 302) may utilize the mapping of a field's vocabulary to transform a resource transmission record (such as a transaction record, for example) into an encoded resource transmission record (namely, input embeddings) as described herein.

Additionally, in the embodiment, the symbols in these vocabularies may be treated as discrete categorical variables. However, it should be noted that the field values (or field-specific inputs that are available/possible for a given field) may not have a one-to-one mapping with the corresponding field's vocabulary. For instance, an amount such as 14456 may not have an equivalent symbol in an amount vocabulary and, hence, may be mapped to a quantized value, such as 14500 for example. The quantization function utilized herein varies with scale and depends on the level of detail that the model wishes to capture for a numeric value.

In an embodiment, an embedding lookup layer may be utilized to transform the discrete symbols within a field's vocabulary into a high dimensional continuous vector that reflects the semantic meaning of a symbol. However, the vocabulary of a field such as an account field might contain millions of symbols. Therefore, as a result, the number of parameters required to model the embedding layer for the account field may be prohibitively expensive in terms of memory and storage. Furthermore, there may not be sufficient numbers of training examples to effectively capture an account's characteristics in a high dimensional space.

Accordingly, to tackle this issue, an embedding space may be partitioned in a non-uniform manner, and a symbol may be assigned to a partition based on the characteristics of an account. Moreover, the embedding space's partitioning may be guided by a power-law distribution, which results in regions of varying densities. However, in an alternative or additional embodiment, other non-uniform approaches such as exponential distribution, logarithmic distribution, pareto distribution, and zipf's law distribution may be utilized to partition a representation space.

In an embodiment, the account vocabulary may also be segmented into equivalent numbers of bins, as embedding space partitions, as depicted in FIG. 6. Such segmentation may employ a complex function that depends on multiple aspects including, for example, the importance of an account, its frequency in the transaction space, information richness and geospatial characteristics. Consequently, an account space segmentation, for example, can also be irregular and could potentially comprise a small number of bins that contain a large number of accounts.

For the purposes of this disclosure, a "power law distribution" may refer to a continuous univariant distribution of a variable that has a positive magnitude whose probability is inversely proportional to that magnitude, an "exponential distribution" may refer to a continuous probability distribution that is based on an exponential function and may be utilized to model an elapsed time between at least two events, a "logarithmic distribution" may refer to a discrete probability distribution that is logarithmic or derived from the Maclaurin series expansion in mathematics, a "pareto distribution" may refer to a distribution where 80% of the results are due to 20% of the inputs, and "zipf's law distribution" may refer to a distribution where a frequency of an occurrence is inversely proportional to the occurrence's rank relative to other possible occurrences.

In further embodiments, an account within a bin may be assigned to a corresponding embedding partition where such an assignment of account symbols results in differing concentrations of points. This differing concentration may have densely populated areas of the embedding space correspond to a large number of accounts, while sparse regions are mapped to fewer accounts. For example, see FIG. 6, where an embedding parameter space is partitioned in a non-uniform manner, and its corresponding vocabulary is segmented into irregular bins, where bins with fewer accounts are assigned to a partition that comprises a larger number of parameters.

Accordingly, sparse regions may capture intricate relationships and structures using large numbers of parameters, while dense regions are mapped to a large number of accounts that have substantially fewer parameters. Thereby, this approach reduces the overall number of parameters within an embedding layer and avoids overfitting accounts that are only associated with a small amount of information.

In an embodiment, a resource transmission field may be associated with auxiliary information about the resource transmission field. In exemplary embodiments, an account may be categorized as being either internal or external. In the exemplary embodiments, the account may also possess a subsidiary structure, be associated with an industrial hierarchy, and include geospatial information. Moreover, this information may only be available for some records and not for others.

Auxiliary information about a field and an indicator of its availability may be encoded into a vector and projected into a high dimensional feature space by utilizing a set of learnable, non-linear transformations to obtain feature embeddings. The feature vector of a given field may be obtained using several techniques including sparse one-hot encoding, dense compressed encoding, uniformly covered multidimensional distributions, and character encoding, for example.

In an embodiment, once obtained, the feature embeddings may be augmented with the vocabulary embeddings in a disentangled manner and further transformed using field specific non-linear projections. This produces a field embedding vector that is of consistent length across the different fields in a transaction record. These field embedding vectors may be consolidated into a sequence and may be utilized as input embeddings, which are fed into transformer layers. It should be noted that input embeddings may also comprise a dummy field that serves as a summary representation of a resource transmission record.

In an embodiment, transformer 506 may be composed of several transformer layers that each contain a grouped multi-head attention block and a fully connected feed forward network. In the embodiment, a custom attention mechanism (such as transformer attentions 804, for example) that exploits prior information about resource transmission structures to guide a computation of attention weights, may be employed. In particular, the topology of the resource transmission may be utilized to assign biased weights within the attention matrix.

During training, encoder parameters may be learned by utilizing a composite loss function (such as composite loss 808, for example) that utilizes a weighted combination of multiple objectives, where the primary objective may be a reconstruction loss term that recovers input fields that had been masked based on a vocabulary prediction head (such as prediction head 806, for example). Specifically, a small portion of the fields in a transaction record may be masked, and a model-under-training may be penalized when it fails to accurately predict the value of the masked fields.

Figure 7:
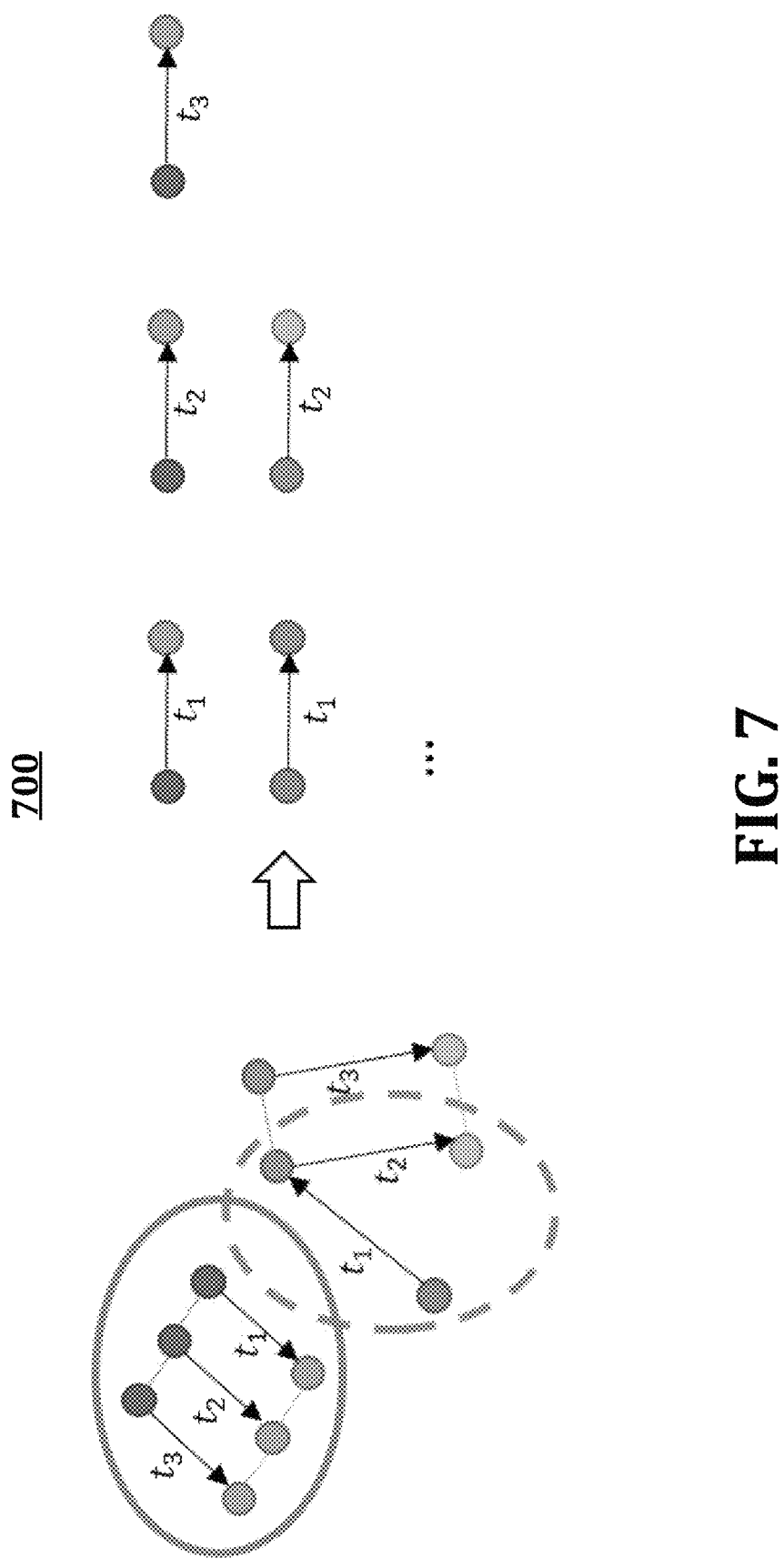
FIG. 7 depicts an exemplary transformation of an arrangement of at least one set of resource transmissions.

An auxiliary objective, depicted in FIG. 7 and utilized by the composite loss function (e.g., composite loss 808), may place similar transactions in the same area of a representation space. In detail, for a given transaction in a batch marked as an anchor, the most similar and least dis-similar transactions within the batch for this anchor transaction may be identified, where a loss term results in a penalty when a distance between an anchor and a similar transaction is less than the distance between the anchor and a dissimilar transaction. Moreover, a margin term may also be included in order to capture soft boundaries and to ensure the logical grouping of related transactions in the representation space.

In an exemplary embodiment, FIG. 7 depicts an exemplary transformation 700 of an arrangement of at least one sequence/set of resource transmissions. To be specific, as depicted in FIG. 7, a dynamic graph is utilized to create a temporarily closed set of resource transmissions (depicted on the left), which are then sampled and utilized as input (depicted on the right) to an encoder, such as encoder 502.

In an embodiment, the inputs to encoder 502 may be a batch of transaction records that are independently sampled with no particular relationship between them. Additionally, a batch element usually contains only a single record. Encoder 502 may accept multiple transaction records that may (or may not) be related to each other, both within and across batch elements.

In exemplary embodiments, a sequence of transaction records that have spatio-temporal relationships may correspond to a single input batch element. In such embodiments, to create these related records, a dynamic network graph may be constructed where account fields are depicted as nodes within the graph. Additionally, the timestamp of a resource transmission from a first account to another, may be modeled as edges within the graph.

In these embodiments, a temporally closed subgraph of an account may then be identified from the above network graph, and a chain of resource transmissions may be sampled from the subgraph using a depth-wise search and a breadth-wise search. See, e.g., FIG. 7. The resulting resource transmission sequence may be input into encoder 502, and encoder 502 may perform a cross-attention function across resource transmission fields from different resource transmissions.

Figure 8:
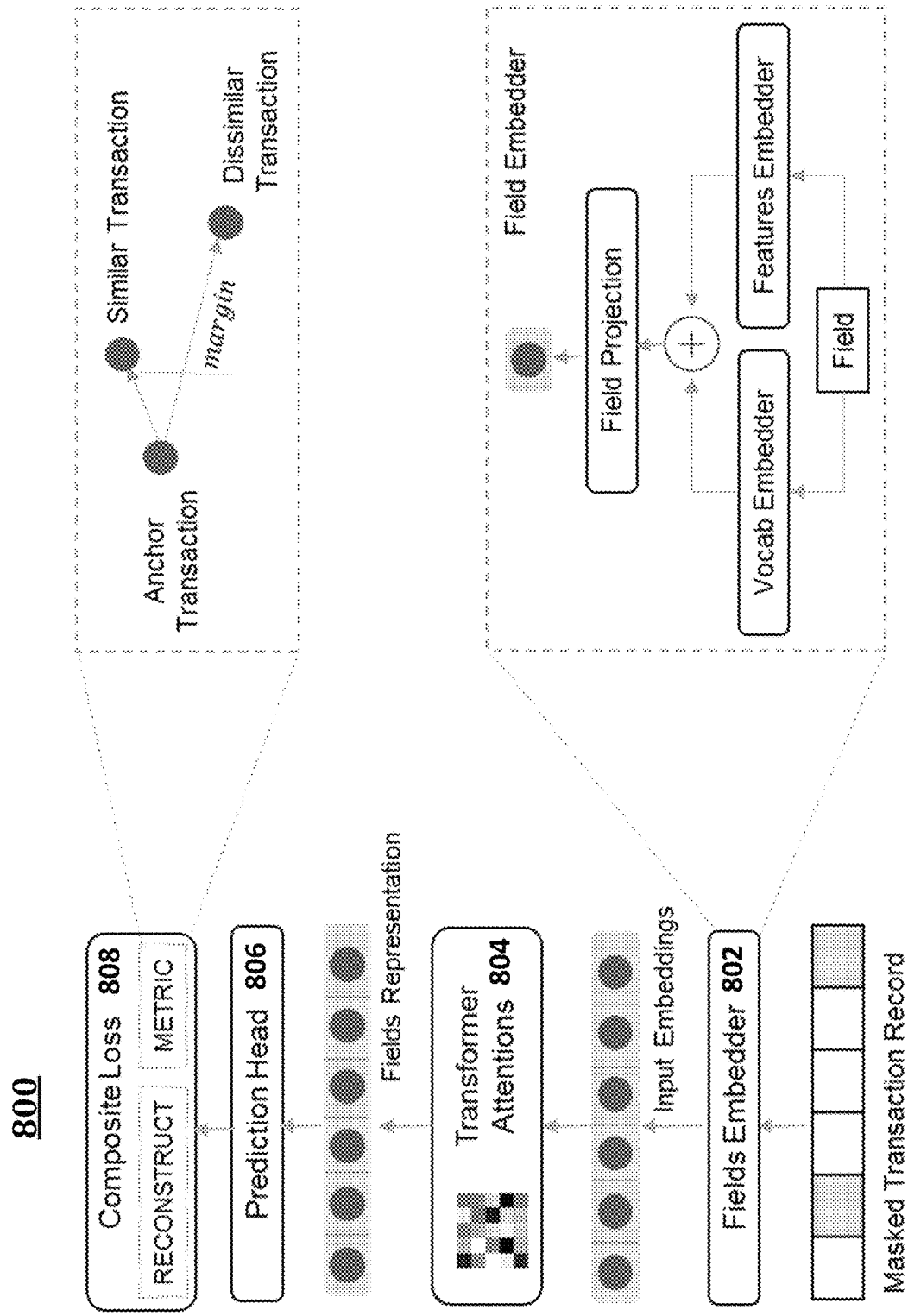
FIG. 8 depicts an exemplary system for symmetrically encoding resource transmission requests.

Turning to FIG. 8, an exemplary system 800 for symmetrically encoded resource transmission requests is depicted. As depicted, in FIG. 8, a resource transmission request in the form of a masked transaction record may be input into (or received by) a fields embedder module (such as fields embedder 802, for example) that processes received transmission/transaction records based on their corresponding set of field-specific vocabularies.

For example, as depicted in system 800, each field may be processed by a field embedder that comprises a field-specific vocab embedder module and separate processed by a features embedder module. As shown, the output of each of these two modules is combined, and a field projection of the processed field is output by the field embedder to generate an input embedding. Accordingly, the input embeddings output by fields embedder 802 comprises the aggregate of the field projection (i.e., an encoded representation) of each field of a received masked transaction record.

Accordingly, as shown in system 800, fields embedder 802 outputs a set of input embeddings, which is simply an encoded representation of a corresponding resource transmission/transaction such as the masked transaction record of system 800, for example. As illustrated in system 800, the set of input embeddings output by fields embedder 802 is input into transformer attentions 804, which processes the input embeddings by computing and assigning biased weights within an attention matrix that is designed to meet multiple objectives, as described in the above discussion of transformer 506.

In system 800, transformer attentions 804 processes input embeddings and outputs, based on the attention matrix, a fields representation of the input embeddings. Each fields representation output by transformer attentions 804 is input into prediction head 806 and processed as described in the above discussion of the herein-presented foundational resource transmission model's training.

A decoder component such as decoder 504 is based on an LLM 508. As shown in system 500, decoder 504 receives at least one encoded resource transmission request (namely, as "transaction embed") along with task specific instructions (namely, "text embed") as input and generates a corresponding response to the task specific instructions in a textual format (namely, "generated response").

In addition, the generated response output by decoder 504 also contains relevant explanations that detail the reasoning/ rationale behind a task specific instruction's response. Generally, LLMs (such as LLM 508, for example) only support text-based inputs and outputs. However, resource transmission requests generally include a corresponding tabular structure.

Accordingly, adapters 510 convert initial resource transmission record embeddings (encoded resource transmissions and requests) into enhanced embeddings that comprise additional sequential, contextual and domain information for textual understanding, and adapters 510 feed the converted resource transmission record embeddings into LLM 508. In an exemplary embodiment, for optimized efficiency, the transaction embeddings and text embeddings maybe interleaved i.e. we may have text embeddings (e.g. the sentinel T1) followed by transaction embeddings (e.g. ABC Inc, XY Corp, $100, Dec. 1, 2024) followed by text embeddings (e.g. The data above is . . . ) and so on and so forth.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed, rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims, and their equivalents, and shall not be restricted or limited by the foregoing detailed description.

What is claimed is:

1. A method for implementing a resource transmission management tool that processes resource transmissions, the method comprising:
   obtaining a first set of requests that comprises at least a first resource transmission request;
   respectively transforming each of the at least the first resource transmission request into at least a first corresponding encoded resource request, wherein each of the at least the first corresponding encoded resource request includes a set of resource transmission request fields that comprises a respectively corresponding set of transmission request field input data and a respectively corresponding set of transmission request field features; and
   generating, by organizing an arrangement of the at least the first corresponding encoded resource request, a pre-processed set of requests that comprises the at least the first corresponding encoded resource request.

2. The method of claim 1, further comprising:
   assigning, based on a topology of the pre-processed set of requests, a respectively corresponding weight to each transmission request field from among the pre-processed set of requests, wherein the pre-processed set of requests comprises the set of resource transmission request fields of each encoded resource request from among the at least the first corresponding encoded resource request;
   analyzing the pre-processed set of requests based on an associated set of instructions; and
   generating, based on the analyzing, at least one response to at least one instruction from among the associated set of instructions.

3. The method of claim 2, wherein the at least one response is generated by a large-language model (LLM) first artificial intelligence and machine learning (AI/ML) model.

4. The method of claim 2, further comprising:
   respectively determining, by the analyzing, a corresponding path and authenticity for each requested resource transmission from among the first set of requests; and responding to each requested resource transmission with one from among a rejection, a modification, and an authorization.

5. The method of claim 2, wherein the analyzing comprises alternatingly receiving:
each encoded resource request from among the pre-processed set of requests; and
respectively corresponding instructions from among the associated set of instructions.

6. The method of claim 2, wherein the assigning comprises:
utilizing an attention mechanism to determine the respectively corresponding weight of each transmission request field from among the set of resource transmission request fields,
wherein the attention mechanism computes the set of weights by exploiting prior information about each encoded resource request from among the pre-processed set of requests.

7. The method of claim 1, wherein within the organized arrangement:
the at least the first corresponding encoded resource request has a first location that is adjacent to a second location that comprises a second encoded resource request that has commonalities with the first resource transmission request; and
the first location is closer to the second location than a third location that comprises a third encoded resource request that has fewer commonalities with the first corresponding encoded resource request than the second encoded resource request.

8. The method of claim 1,
wherein each resource transmission request field includes respectively corresponding transmission request field input data that comprises at least one respectively corresponding input from among a corresponding set of possible field-specific inputs; and
wherein each possible field-specific input is mapped to, based on a power-law distribution, a respectively corresponding partition of the corresponding set of possible field-specific inputs.

9. The method of claim 1, wherein the transforming further comprises:
utilizing sparse one-hot encoding to encode, as a first corresponding set of vectors, auxiliary request field information that respectively corresponds to each resource transmission request field from among the at least the first resource transmission request.

10. The method of claim 1, wherein the transforming is performed by a second AI/ML model that utilizes a composite loss function.

11. A system for implementing a resource transmission management tool that processes resource transmissions, the system comprising:
a processor; and
memory storing instructions that, when executed by the processor, cause the processor to perform operations comprising:
obtaining a first set of requests that comprises at least a first resource transmission request;
respectively transforming each of the at least the first resource transmission request into at least a first corresponding encoded resource request, wherein each of the at least the first corresponding encoded resource request includes a set of resource transmission request fields that comprises a respectively corresponding set of transmission request field input data and a respectively corresponding set of transmission request field features; and
generating, by organizing an arrangement of the at least the first corresponding encoded resource request, a pre-processed set of requests that comprises the at least the first corresponding encoded resource request.

12. The system of claim 11, wherein when executed, the instructions cause the processor to perform further operations comprising:
assigning, based on a topology of the pre-processed set of requests, a respectively corresponding weight to each transmission request field from among the pre-processed set of requests, wherein the pre-processed set of requests comprises the set of resource transmission request fields of each encoded resource request from among the at least the first corresponding encoded resource request;
analyzing the pre-processed set of requests based on an associated set of instructions; and
generating, based on the analyzing, at least one response to at least one instruction from among the associated set of instructions.

13. The system of claim 12, wherein when executed, the instructions cause the processor to perform further operations comprising:
respectively determining, by the analyzing, a corresponding path and authenticity for each requested resource transmission from among the first set of requests; and
responding to each requested resource transmission with one from among a rejection, a modification, and an authorization.

14. The system of claim 12, wherein when the instructions are executed, the analyzing comprises alternatingly receiving:
each encoded resource request from among the pre-processed set of requests; and
respectively corresponding instructions from among the associated set of instructions.

15. The system of claim 12, wherein when the instructions are executed, the assigning comprises:
utilizing an attention mechanism to determine the respectively corresponding weight of each transmission request field from among the set of resource transmission request fields,
wherein the attention mechanism computes the set of weights by exploiting prior information about each encoded resource request from among the pre-processed set of requests.

16. A non-transitory computer-readable medium for implementing a resource transmission management tool that processes resource transmissions, wherein the computer-readable medium stores instructions that, when executed by a processor, cause the processor to perform operations comprising:
obtaining a first set of requests that comprises at least a first resource transmission request;
respectively transforming each of the at least the first resource transmission request into at least a first corresponding encoded resource request, wherein each of the at least the first corresponding encoded resource request includes a set of resource transmission request fields that comprises a respectively corresponding set of transmission request field input data and a respectively corresponding set of transmission request field features; and generating, by organizing an arrangement of the at least the first corresponding encoded resource request, a pre-processed set of requests that comprises the at least the first corresponding encoded resource request.

17. The computer-readable medium of claim 16, wherein when executed, the instructions cause the processor to perform further operations comprising:

assigning, based on a topology of the pre-processed set of requests, a respectively corresponding weight to each transmission request field from among the pre-processed set of requests, wherein the pre-processed set of requests comprises the set of resource transmission request fields of each encoded resource request from among the at least the first corresponding encoded resource request;

analyzing the pre-processed set of requests based on an associated set of instructions; and generating, based on the analyzing, at least one response to at least one instruction from among the associated set of instructions.

18. The computer-readable medium of claim 16, wherein when the instructions are executed, within the organized arrangement:

the at least the first corresponding encoded resource request has a first location that is adjacent to a second location that comprises a second encoded resource request that has commonalities with to the first resource transmission request; and the first location is closer to the second location than a third location that comprises a third encoded resource request that has fewer commonalities with the first corresponding encoded resource request than the second encoded resource request.

19. The computer-readable medium of claim 16, wherein when the instructions are executed, each resource transmission request field includes respectively corresponding transmission request field input data that comprises at least one respectively corresponding input from among a corresponding set of possible field-specific inputs; and each possible field-specific input is mapped to, based on a power-law distribution, a respectively corresponding partition of the corresponding set of possible field-specific inputs.

20. The computer-readable medium of claim 16, wherein when the instructions are executed, the transforming further comprises:

utilizing sparse one-hot encoding to encode, as a first corresponding set of vectors, auxiliary request field information that respectively corresponds to each resource transmission request field from among the at least the first resource transmission request.

* * * * *